United States Patent
Kurata

(10) Patent No.: US 9,075,553 B2
(45) Date of Patent: Jul. 7, 2015

(54) PRINTING IN ACCORDANCE WITH SHEET SIZE

(75) Inventor: Yasuo Kurata, Kawasaki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 952 days.

(21) Appl. No.: 12/613,948

(22) Filed: Nov. 6, 2009

(65) Prior Publication Data

US 2010/0073724 A1    Mar. 25, 2010

Related U.S. Application Data

(63) Continuation of application No. PCT/JP2009/061024, filed on Jun. 17, 2009.

(30) Foreign Application Priority Data

Jun. 20, 2008 (JP) ................................. 2008-162306

(51) Int. Cl.
*G06F 15/00* (2006.01)
*G06F 3/12* (2006.01)

(52) U.S. Cl.
CPC ............ *G06F 3/1285* (2013.01); *G06F 3/1204* (2013.01); *G06F 3/1254* (2013.01)

(58) Field of Classification Search
CPC ... G06F 3/1202; G06F 3/1203; G06F 3/1204; G06F 3/1208; G06F 3/125; G06F 3/1253; G06F 3/1254; G06F 3/1285; H04N 1/00962; H04N 1/00965; H04N 1/387; H04N 1/393; G06T 3/40

USPC .................... 358/1.1, 1.2, 1.9, 1.15, 401, 451
See application file for complete search history.

(56) References Cited

U.S. PATENT DOCUMENTS

| 5,745,659 | A | 4/1998 | Rigau et al. | |
| 6,559,971 | B1* | 5/2003 | Watts et al. | 358/1.2 |
| 7,307,745 | B2 | 12/2007 | Tanaka | |
| 8,102,543 | B2 | 1/2012 | Tomomatsu | |
| 2002/0054343 | A1 | 5/2002 | Nagata | |
| 2003/0137691 | A1 | 7/2003 | Tanaka | 358/1.15 |
| 2005/0012941 | A1* | 1/2005 | Takahashi | 358/1.2 |
| 2005/0157321 | A1 | 7/2005 | Alacar | 358/1.13 |

FOREIGN PATENT DOCUMENTS

| JP | 2002-127566 A | 5/2002 |
| JP | 2003-216366 | 7/2003 |
| JP | 2003-216366 A | 7/2003 |
| JP | 2003-216367 | 7/2003 |
| JP | 2003-256169 | 9/2003 |
| JP | 2004-240754 A | 8/2004 |
| JP | 4244742 B2 | 2/2005 |
| JP | 2006-018441 A | 1/2006 |
| JP | 2009-238095 A | 10/2009 |

* cited by examiner

*Primary Examiner* — Thomas D Lee
(74) *Attorney, Agent, or Firm* — Fitzpatrick, Cella, Harper & Scinto

(57) ABSTRACT

A sheet size of a sheet to be used when data generated by an application is printed is specified. A page size is set of a page in which the data generated by the application is arranged, in a page size setting of the application, so that an aspect ratio of the page size fits to an aspect ratio of the specified sheet size. A setting is set for performing scaling of the page from the page size to the specified sheet size.

40 Claims, 16 Drawing Sheets

PRINTING IN ACCORDANCE WITH SHEET SIZE

This application is a continuation of International Application No. PCT/JP2009/061024 filed Jun. 17,2009.

TECHNICAL FIELD

The present invention relates to a plug-in software program (hereinafter abbreviated as a plug-in) that is embedded in a general-purpose application software program (hereinafter abbreviated as an application) on a computer and that extends printing functions in cooperation with a printer driver that controls a printing device. The present invention further relates to a function extension method and function extension device for an application.

BACKGROUND ART

When data edited, displayed, or the like in an application is printed using a printer, printing is generally performed through a printer driver corresponding to the printer. At this time, in order to obtain a printout of a size desired by a user from the printer, the user needs to appropriately set the application and the printer driver to perform printing. Here, many general-purpose applications have been created based on the assumption of cut form sheets (cut paper), and paper sizes that can be set in the applications often have maximum values. Thus, in order to obtain a printout of an output size larger than such a maximum paper size, a user has obtained a printout of the desired size through the following series of operations: (1) calculating a paper size that has the same ratio as the output size and that can be set in the application; (2) setting the paper size in the application; and (3) performing scaling setting for the printer driver from the paper size to the output size.

Meanwhile, there are a large number of applications, for which means for extending functionality have been made public. Examples of the applications include the Microsoft Office (Microsoft Corporation, USA), the Microsoft Internet Explorer (Microsoft Corporation, USA), and the Netscape Navigator (Netscape Communications Corporation, USA). These applications can provide users with an additional function by registering an additional program in accordance with the publicly available means. Then, such an additional program (software program for adding a function) for providing an additional function to an application is generally called a plug-in. A plug-in may be hereinafter referred to as a plug-in software program, plug-in software, or a plug-in program.

Several pieces of conventional art for extending functionality of an application using a plug-in have been proposed (for example, Japanese Patent Laid-Open No. 2003-216366). This conventional art document discloses a plug-in for providing a function for making a print preview.

However, conventional plug-in techniques have problems as follows.

First, in order to obtain a printout of a size larger than the maximum paper size of an application, as described above, it is necessary to perform many procedures. There are problems in that cumbersome operations are required and that therefore labor and time are required to obtain a printout of the desired size.

Furthermore, maximum paper sizes differ from application to application. For example, a size of about 55 cm×55 cm is set in the Microsoft Word, and about 1.3 m×1.3 m in the Microsoft PowerPoint. Therefore, a user needs to take the characteristics (maximum paper sizes) of applications into consideration when calculating a paper size, resulting in a problem in that a high level of knowledge and more complex procedures are required.

The problems as described above arise particularly in performing printing at a large size, such as printing of long rolls of paper or printing of banners, using a printer such as a large format printer. The problems are very high hurdles to overcome when a user performs printing at a large size using a general-purpose application.

CONVENTIONAL ART DOCUMENT

Patent Document
Patent Document 1: Japanese Patent Laid-Open No. 2003-216366

SUMMARY OF INVENTION

Problems to be Solved by the Invention

In order to obtain a printout of a size larger than the maximum paper size of an application, it is necessary to perform many procedures, and a problem occurs in that cumbersome operations are required.

The present invention has overcome the foregoing problems, and aims to provide a plug-in program, a function extension method, and a function extension device in which a printout of a size larger than the maximum paper size of an application can be easily obtained.

The present invention further aims to provide a plug-in program, a method, and a storage medium in which a large printout is output without performing cumbersome procedures, which it has been conventionally necessary for a user to perform, resulting in improved user operability.

Means for Solving the Problems

The present invention provides a plug-in software program that is embedded as plug-in software in a general-purpose application on a computer and that extends functionality of the general-purpose application in cooperation with a printer driver that controls a printing device, including an output size specifying step of specifying an output size for output to a printer, a holding step of holding a maximum paper size that can be set in the application, a calculating step of calculating a paper size to be set in the application, a setting step of setting the paper size in the application, and a scaling setting step of setting a setting for performing scaling from the paper size to the output size in the printer driver, wherein the calculating step calculates the paper size so as to maintain an aspect ratio of the output size which is within the maximum paper size.

The present invention further provides the plug-in software program, wherein the scaling setting step is any one of scaling for performing scaling by specifying a size, scaling for performing scaling by specifying a scaling factor, and scaling for performing scaling by specifying a width for output.

The present invention further provides the plug-in software program, wherein the scaling setting step, when performing the scaling setting, registers at least one of the paper size and the output size in the printer driver.

MODE FOR CARRYING OUT THE INVENTION

Exemplary Embodiment
Exemplary Embodiment 1

Figure 1:
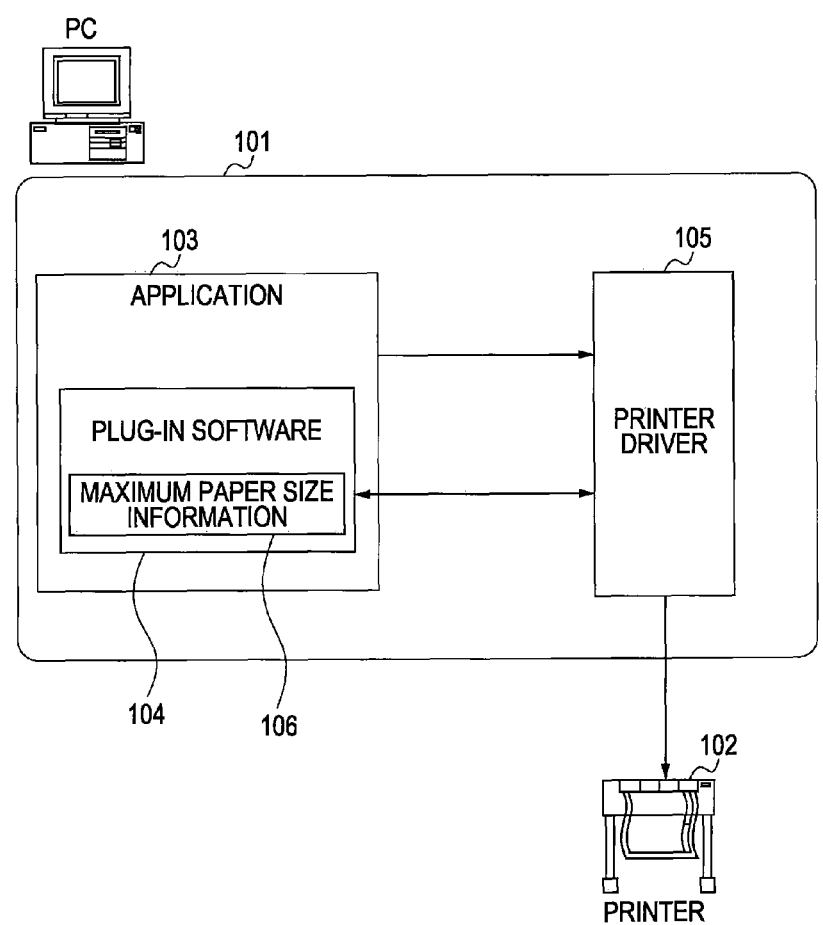
FIG. 1 is a block diagram showing a schematic configuration of a system having plug-in software in an exemplary embodiment of the present invention.

FIG. 1 is a system configuration diagram of a system having a plug-in software program (also called plug-in software or a plug-in program) of an exemplary embodiment of the present invention, and the system is constituted by a PC 101 and a printer 102 which is represented by a large format printer.

103 denotes an application software program (hereinafter called an application) operating on the PC 101. In the present exemplary embodiment, a general-purpose application will be explained in the context of the Microsoft Word (hereinafter simply called the application) by way of example. The Microsoft Word is an application of Microsoft Corporation, USA, and is an application used for creating a general document or an original of a printout. As described earlier, means for embedding additional functions have been made public.

104 denotes an extension means (which corresponds to a plug-in) for extending the functionality of the application, which operates on the application to set the application in a manner described below and which operates in cooperation with a printer driver that controls a printer. The main part of the exemplary embodiment of the present invention is included in the plug-in 104.

105 denotes a printer driver that is requested by the application to perform printing through an operating system (hereinafter called an OS). The printer driver interprets a printing instruction received through the OS, and performs a process of generating printer-interpretable print data. A change of the print setting is also accepted from the plug-in.

106 denotes maximum paper size information, which is information about a maximum paper size that can be set in the application. The maximum paper size set in the application (the Microsoft Word) is 55 cm in width and 55 cm in length. The maximum paper size information 106 is owned by the plug-in, and is used in a plug-in program described below.

Here, the Microsoft Word is employed as the general-purpose application in the present exemplary embodiment. However, applications are not limited thereto, and the plug-in of the present invention can be applied to all applications that provide an extension means equivalent to that of the Microsoft Word.

Figure 2:
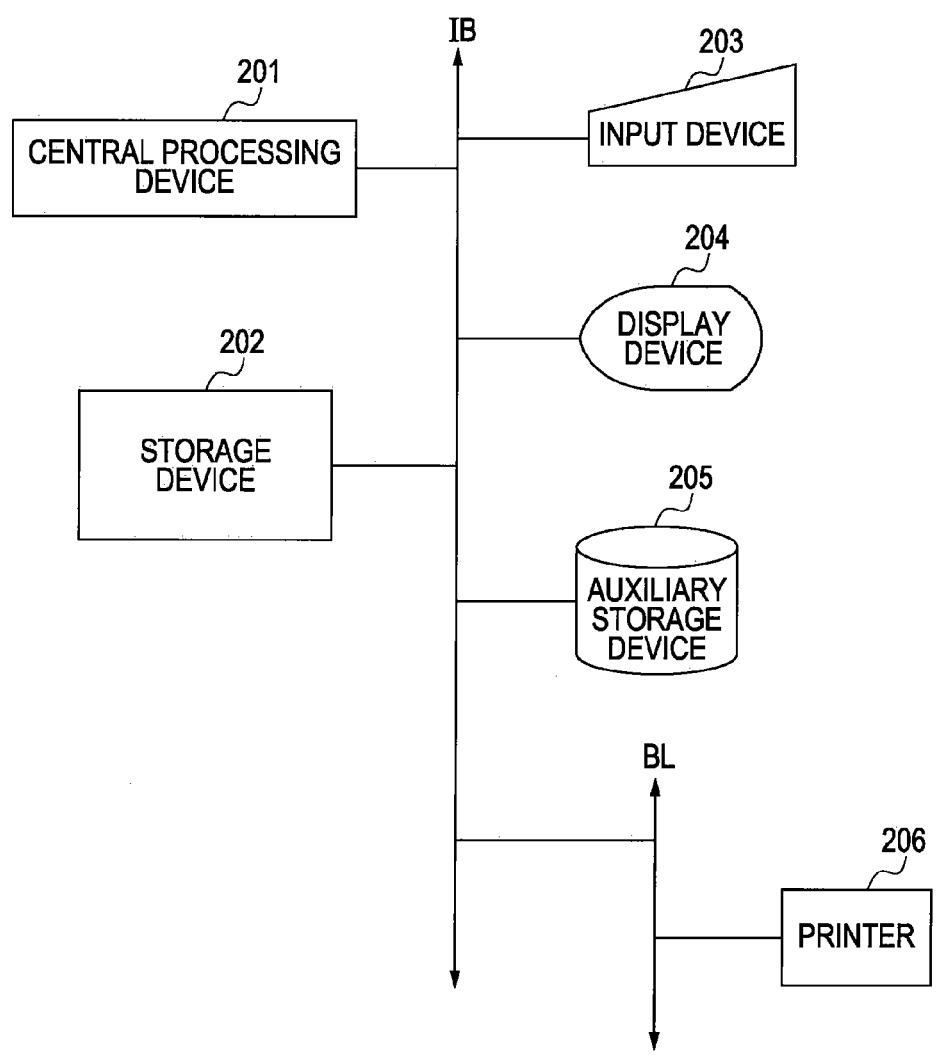
FIG. 2 is a diagram showing a connection between the internal structure of a PC having plug-in software and the outside.

FIG. 2 is a block diagram showing a connection between the internal structure of a PC and the outside.

This PC has a general configuration, including a central processing device 201 having a CPU, a storage device 202 such as a RAM, an input device 203 such as a mouse or a keyboard, a display device 204 such as a CRT or an LCD, and an auxiliary storage device 205 such as a hard disk or a magneto-optical disk, which are connected to one another via an internal bus line IB.

The input device 203 is designed to allow user to perform various inputs on icons or menus displayed on the display device by the application or plug-in or other objects in accordance with user operations.

The auxiliary storage device 205 stores the plug-in of the present invention, the application, the OS, and other program information, which are called by the central processing device 201 as necessary and are stored in the storage device 202.

Further, the internal bus line IB of the PC 101 is connected to a printer 206 (which refers to the printer 102 in FIG. 1) via an external bus line BL so that a job can be registered in the printer 206 (printer 102) using the PC. Here, the registration of a job refers to that a print job is created based on text created using the application and is transmitted from the PC to the printer to instruct the printing of the print job.

In the following, an explanation will be given of the plug-in of the present invention in accordance with the operation of the plug-in 104 which has been registered as a system component in the application.

Figure 3:
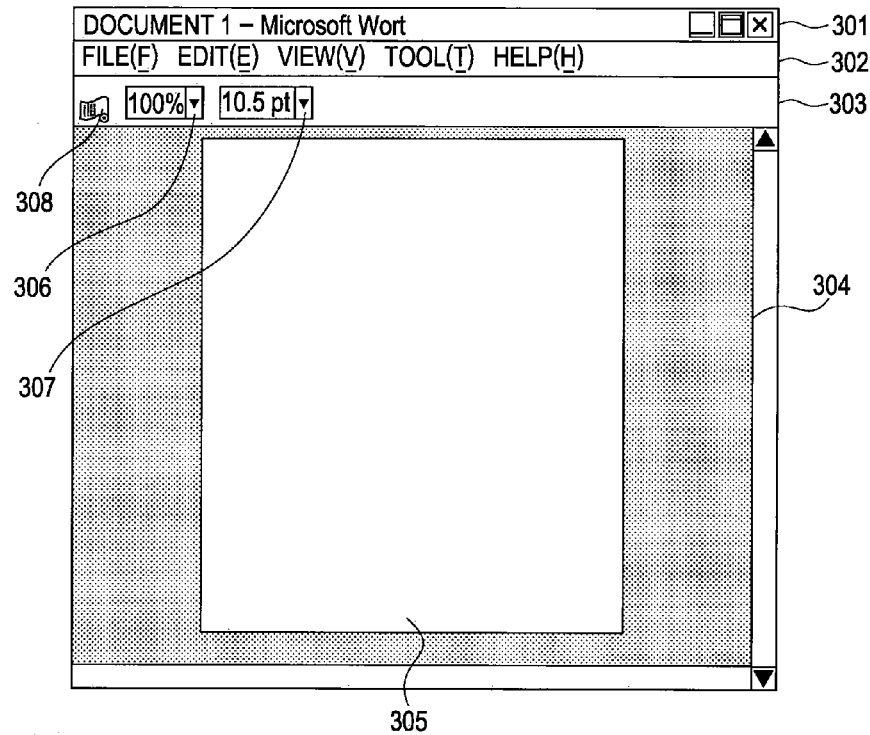
FIG. 3 shows a screen obtained when an application is started.

FIG. 3 represents a screen for which the application has been started. The screen of the application includes a title bar 301 where the title of the document currently being created, the name of the application, and the like are displayed, a menu bar 302 where the functions of the application are displayed in the form of menus, a toolbar 303 where the functions of the plug-in or application are controlled and are arranged using icons or the like, and a document display area 304 where the document currently being created is displayed.

In the document display area 304, an original 305 which is currently being targeted for editing by the user is displayed. Here, it is now assumed that the A4 size (210 mm in width, 297 mm in length), which is the general setting in the application, is set as the paper size of the original 305.

306 denotes a display scaling factor specifying control option for specifying the scaling factor at which the original 305 is displayed in the document display area 304. 307 denotes a font size specification control option for specifying the font size of a character string to be input in the original 305.

308 denotes a plug-in start icon that is displayed in the toolbar 303 of the application by registering the plug-in of the present invention as a system component in the application (also referred to as installing the plug-in into the application). Here, it is assumed that the plug-in of the present invention has already been registered in the application. The method for registering the plug-in as a system component in the application is well-known and will not be explained.

Figure 4:
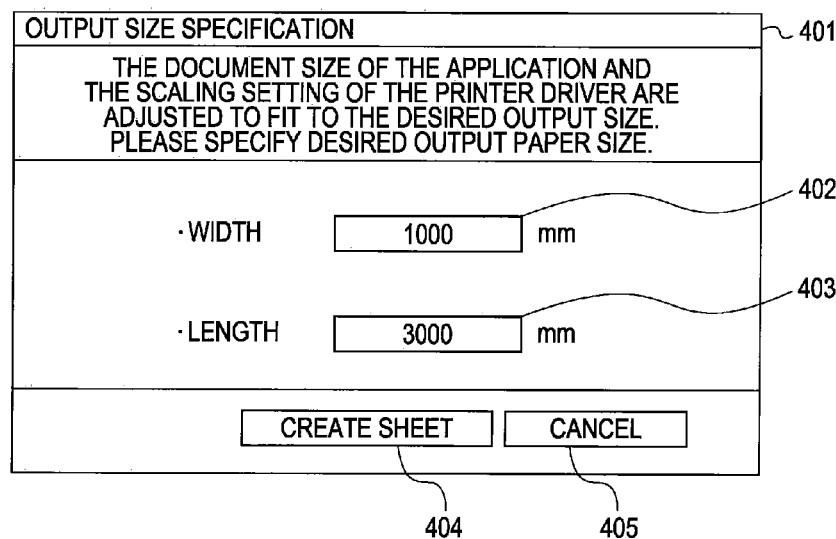
FIG. 4 shows an example of a dialog for specifying an output size.

FIG. 4 shows an output size specification dialog 401 that is a screen for allowing a user to input an output size, which is displayed by pressing the plug-in start icon 308 of the present invention by the user.

The output size specification dialog 401 includes a control option for specifying the size (hereinafter, called an output size) of a product which the user wishes to print using the printer 102. Here, the plug-in start icon is pressed, thereby providing a transition of the screen, which is in a selection state where an input is accepted from the user, from the application to the output size specification dialog 401, and the settings of the application 103 and the like can no longer be changed.

402 denotes a width specification control option for specifying the width of the output size in millimeter increments, and 403 denotes a length specification control option for specifying the length of the output size in millimeter increments. Here, it is now assumed that the user has input numerical values, thereby specifying 1000 mm as the width of the output size in the width specification control option 402 and 3000 mm as the length of the output size in the length specification control option 403.

404 denotes a sheet creation button for setting the application 103 and the printer driver 105 so that, when it is pressed by the user, printing can be performed at the output size (the size input by the user in the control options 402 and 403 in the output size specification dialog 401). Then, when the output size specification dialog 401 is closed, at the same time, the screen where a user input is to be performed is changed from the output size specification dialog 401 to the screen of the application 103.

405 denotes a cancel button which can be pressed by the user at a desired timing during the display of the output size specification dialog 401. When the cancel button 405 is pressed, the content set by the user in the output size specification dialog 401 is invalidated, and the output size specification dialog 401 is closed so that the screen where a user input is to be performed is changed to the screen of the application 103.

Figure 12:
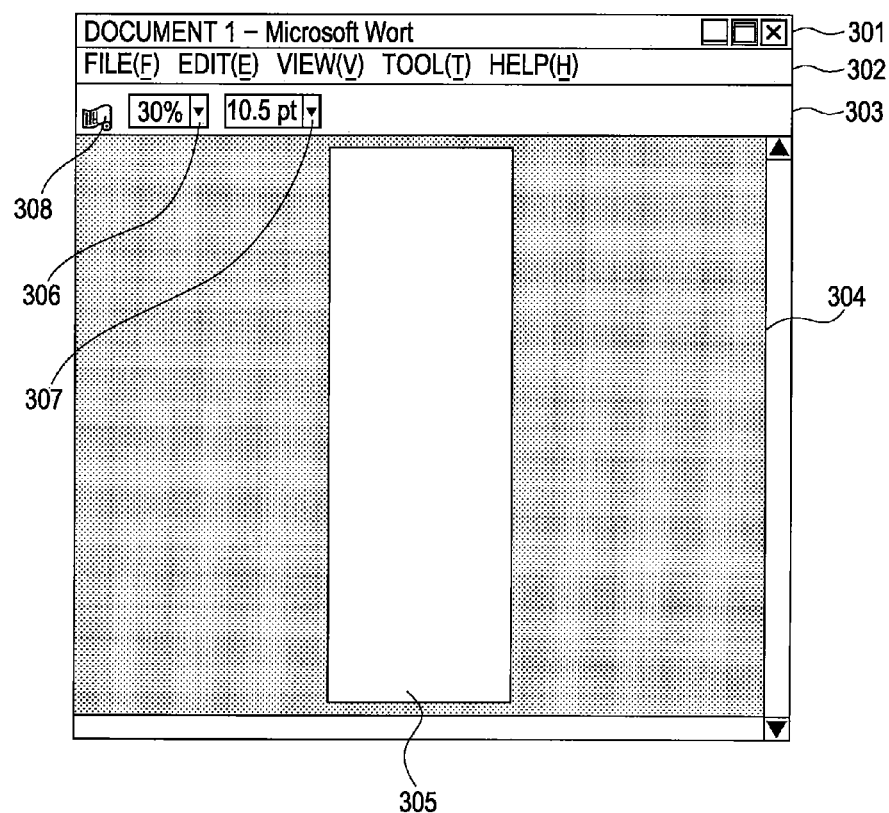
FIG. 12 shows a screen obtained after the setting of the paper size of the application has been changed in Exemplary Embodiment 1.

FIG. 12 shows a state where the screen where a user input is to be performed has been returned to the screen of the application 103 by pressing the sheet creation button 404 after an output size has been specified in the output size specification dialog 401. In the output display area 304, the original 305 having the same aspect ratio as the output size is being displayed. Internally, furthermore, the printer driver 105 is set using a plug-in program described below so that a printout of the output size can be obtained.

In addition, the scaling factor at which the original 305 is displayed in the output display area 304 has been changed to a setting for displaying an entire page by using the plug-in program described below.

In this state, the user arranges objects such as characters and illustrations on the original 305 and performs printing using the printer 102 through the printer driver 105 on the basis of a print menu of the application 103. Then, a product of the output size can be obtained.

In the following, the detailed operation of the plug-in of the present invention will be explained in accordance with a flowchart.

Figure 6:
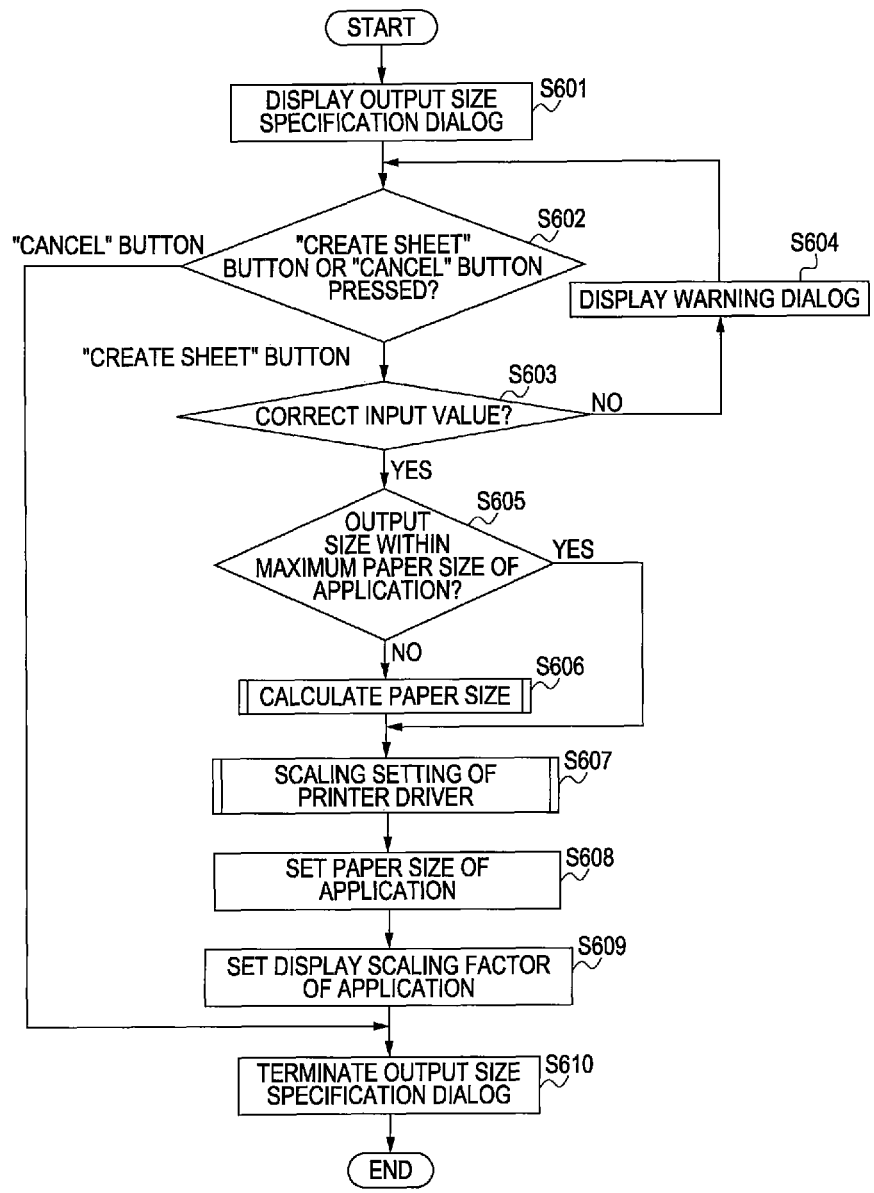
FIG. 6 shows a flow diagram of a program representing a series of operations of a plug-in in Exemplary Embodiment 1.

FIG. 6 is a flowchart of a plug-in program representing a series of operations in the plug-in of the present invention.

First, when the user presses the plug-in start icon 308 in the toolbar 303 of the application 103, the operation of the plug-in program starts, and the control proceeds to S601.

In S601, the output size specification dialog 401 described above is displayed, and enters an input wait state for an operation by the user.

When the user presses the sheet creation button 404 or the cancel button 405 in the output size specification dialog 401, then in S602, the type of the pressed button is checked. Here, when the pressed button is the cancel button 405, the control proceeds to S610, and the output size specification dialog 401 is closed so that the plug-in program ends.

On the other hand, when the button pressed by the user is the sheet creation button 404, then in S603, it is determined whether or not the output size values input in the width specification control option 402 and the length specification control option 403 are correct. Here, a value that is not correct means that a non-numerical value has been input, a negative value has been input, no value has been input, an output size that is not supported by the printer 102 has been input, or the like. A size that is not supported by the printer 102 is acquired by the plug-in of the present invention by sending an inquiry to the printer driver 105 when the determination is performed.

Figure 5:
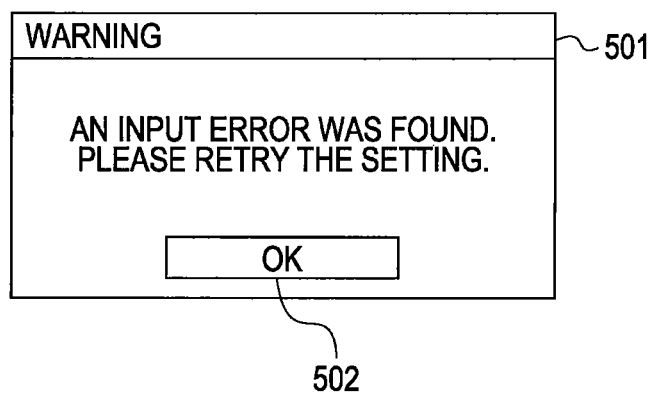
FIG. 5 shows an example of a dialog displayed when an output size is incorrectly specified.

When it is determined in S603 that the output size values are not correct, then in S604, a warning dialog 501 shown in FIG. 5, which is a screen for providing a warning to the user, is displayed. When the user presses an OK button 502, the input wait state of the output size specification dialog 401 is entered again.

When it is determined in S603 that the output size is correct, the process proceeds to S605.

Here, it is now assumed that, as shown in FIG. 4, a width of 1000 mm and a length of 3000 mm have been specified in the output size specification dialog 401. In this case, this output size is regarded as a size for which output is supported by the printer. Then, the process proceeds to S605.

Next, in S605, it is determined whether or not the output size is within the maximum paper size of the application 103. Specifically, a comparison is made between the maximum paper size information 106 owned by the plug-in and the output size input by the user.

Figure 9:
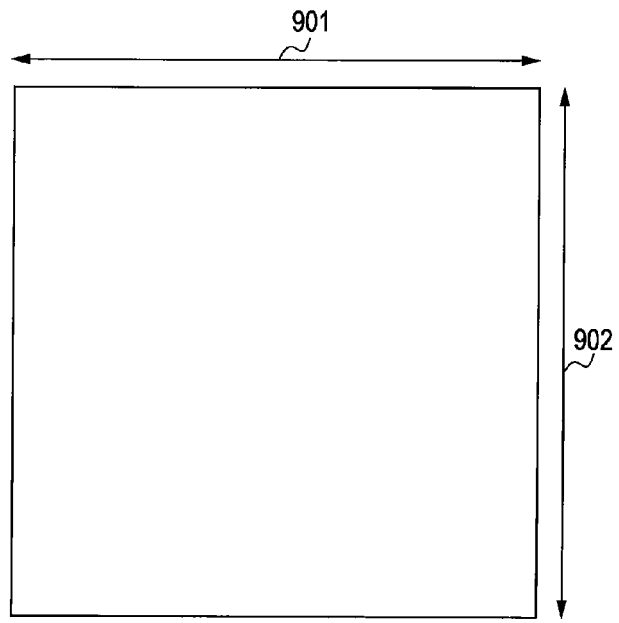
FIG. 9 shows a diagram schematically showing a sheet of paper corresponding to the maximum paper size of an application.

FIG. 9 is a diagram schematically showing a sheet of paper corresponding to the size of the maximum paper size information 106. Since the maximum paper size set in the application is, as described above, 55 cm in width and 55 cm in length, it is assumed that each of the width 901 and length 902 of the sheet of paper in FIG. 9 corresponds to 55 cm.

Figure 10:
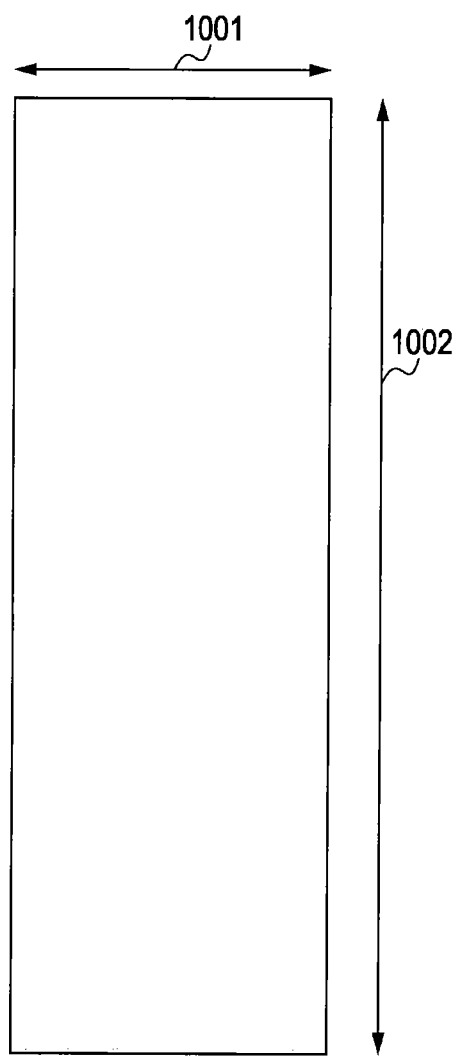
FIG. 10 shows a diagram schematically showing a sheet of paper corresponding to an output size specified by a user.

FIG. 10 is a diagram schematically showing a sheet of paper corresponding to the output size specified by the user. Here, as explained in FIG. 4, since the width and length input by a user operation are 1000 mm and 3000 mm, respectively, the width 1001 and length 1002 of the output size correspond to 1000 mm and 3000 mm, respectively.

In S605, a comparison is made between the width 901 of the maximum paper size and the width 1001 of the output size, and a comparison is made between the length 902 of the maximum paper size and the length 1002 of the output size. Then, when at least one of the width and length of the output size is greater, it is determined that the output size is not within the maximum paper size. Then, the process proceeds to S606.

In S606, a paper size is calculated. The paper size means the size of a sheet of paper which is set in the application 103 by the plug-in of the present invention.

Figure 7:
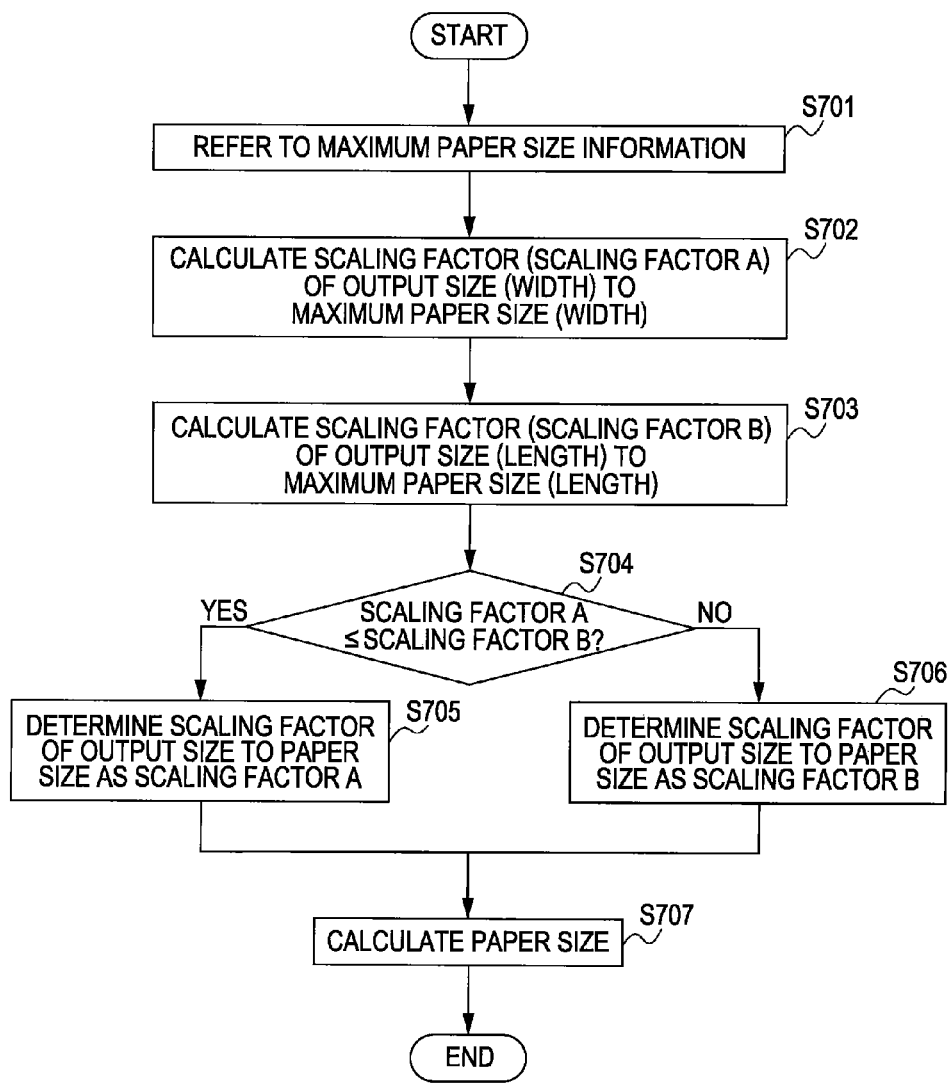
FIG. 7 shows a flow diagram of a program for calculating a paper size in Exemplary Embodiment 1.

FIG. 7 shows a flowchart of a paper size calculation program that is executed by the plug-in program when a paper size is calculated in S606.

In S701, the paper size calculation program refers to the maximum paper size information 106 held in the plug-in software 104, and holds the maximum paper size information 106 in the program.

In S702, a scaling factor (scaling factor A) of the width 1001 of the output paper size to the width 901 of the maximum paper size is calculated. Now, the scaling factor A is given by 55% (=55 cm/1000 mm) using the output paper size and maximum paper size described above. Here, the scaling factor is truncated after the decimal point.

Next, in S703, a scaling factor (scaling factor B) of the length 1002 of the output paper size to the length 1002 of the maximum paper size is calculated. Now, the scaling factor B is given by 18% (=55 cm/3000 mm) using the output paper size and maximum paper size described above. Here, the scaling factor is truncated after the decimal point.

In S704, a comparison is made between the scaling factors A and B calculated in S702 and S703, respectively. When it is determined that the scaling factor A is smaller than the scaling factor B, the process proceeds to S705. When it is determined that the scaling factor A is greater than the scaling factor B, the process proceeds to S706. When the scaling factors A and B are equal to each other, the process can proceed to either S705 or S706. Here, it is assumed that the process proceeds to S705.

In S705, a process of determining the scaling factor of the output size to the paper size as the scaling factor A is performed. In S706, a process of determining the scaling factor of the output size to the paper size as the scaling factor B is performed. Thereby, a scaling factor within the maximum paper size can be set while maintaining the aspect ratio of the output size specified by the user. That is, since a paper size is calculated by multiplying the width and length of the output size by the same scaling factor, the paper size in which the aspect ratio of the output size is maintained can be calculated.

Here, now, the scaling factor A is 55% and the scaling factor B is 18%. Thus, as a result of the determination of S704, the process proceeds to S706, in which it is determined that the scaling factor of the output size to the paper size is 18%.

Next, in S707, a paper size is calculated. The calculation of a paper size is performed by multiplying the output size by the scaling factor determined in S705 or S706.

Figure 11:
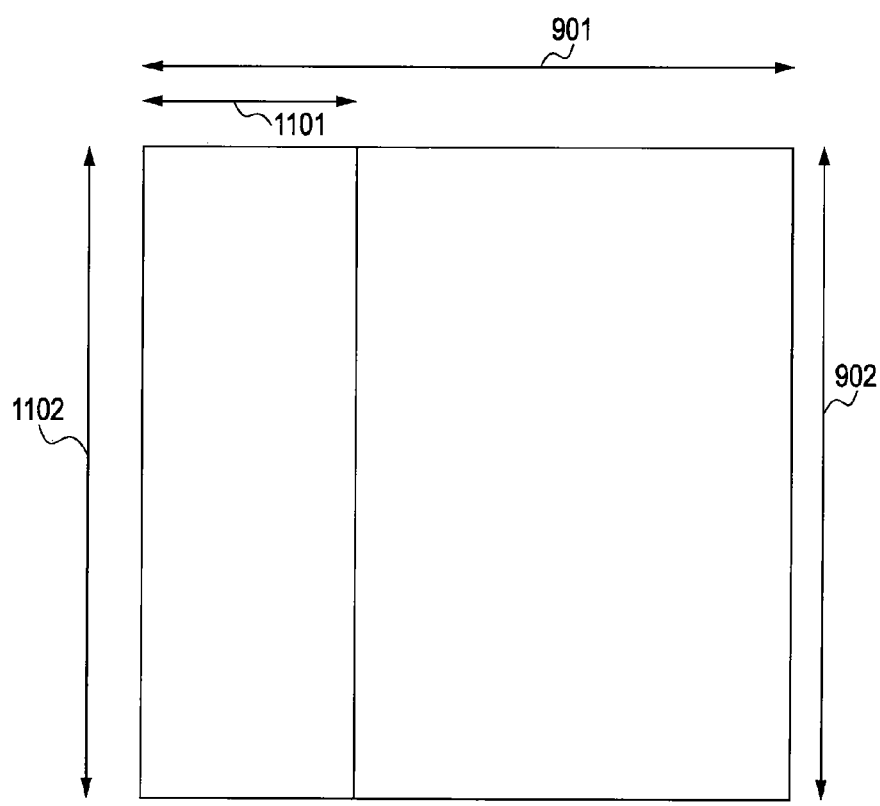
FIG. 11 shows a diagram schematically showing a sheet of paper of the maximum paper size and a sheet of paper of the paper size.

FIG. 11 is a diagram schematically showing a sheet of paper with the maximum paper size and a sheet of paper with the paper size. It is assumed that the size of the outer sheet of paper corresponds to the maximum paper size (assigned the same numerals as those of FIG. 9), and the size of the inner sheet of paper corresponds to the paper size.

Now, based on the calculation of the paper size in S707, it is determined that the width 1101 of the paper size is 180 mm (=1000 mm×18%) and that the length 1102 of the paper size is 540 mm (=3000 mm×18%). Here, since the scaling factors are truncated after the decimal point when they are determined in S705 and S706, the calculated paper size has a width and length that are within the maximum paper size. In the example of the present exemplary embodiment, although the length of the maximum paper size is 55 cm (550 mm), the calculated length of the paper size is 540 mm, which is shorter than the length of the maximum paper size.

The description refers back to the flow of the plug-in program of FIG. 6.

After the completion of the paper size calculation process in S606, in S607, scaling setting is performed for the printer driver 105. This is a process of changing the setting of the printer driver 105 so that printing can be performed at the output size using the printer 102.

Figure 13:
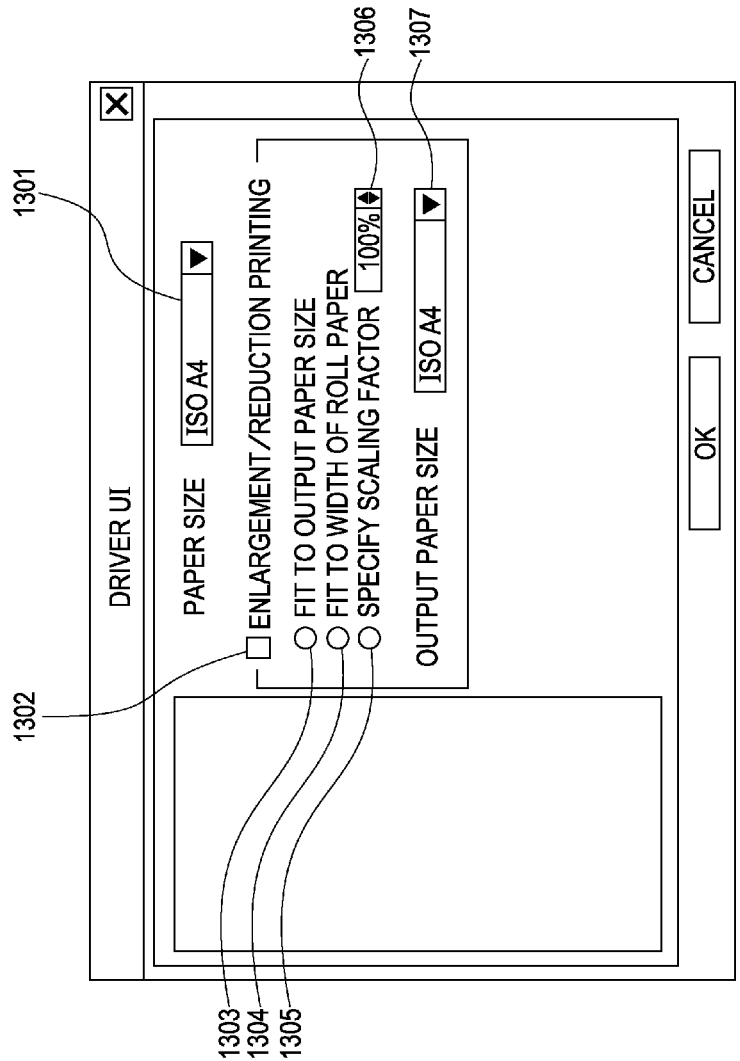
FIG. 13 shows a printer driver setting screen.

FIG. 13 illustrates only a portion relating to the scaling setting in the screen where setting for the printer driver 105 is performed. 1301 denotes a paper size combo box, which is a control option for specifying the paper size of an original created by the application 103. 1302 denotes an enlargement/reduction printing check box. When the enlargement/reduction printing check box 1302 is checked, one scaling setting can be selected from among various scaling settings described below. 1303 to 1305 denote radio buttons for selecting scaling settings, and any one scaling setting can be selected. 1307 denotes an output paper size combo box, which is a control option for specifying the size of a page to be output using the printer 102.

1303 denotes a radio button for fitting to the output paper size. In the printer driver 105, when 1303 for fitting to the output paper size is selected, the printer driver 105 performs a scaling process from the size specified in the paper size combo box 1301 to the size specified in the output paper size combo box 1307.

1304 denotes a radio button for fitting to the width of roll paper. In the printer driver 105, when 1304 for fitting to the width of roll paper is selected, the printer driver 105 activates a roll paper width specification dialog 1401 shown in FIG. 14.

Then, a scaling process is performed so that the width of the paper size 1301 can be changed to the width specified in a roll paper width combo box 1402.

1305 denotes a radio button for specifying a scaling factor. In the printer driver 105, when 1305 for specifying a scaling factor is selected, the printer driver 105 performs the scaling process on the paper size 1301 using the scaling factor specified in a scaling factor specification spin box represented by 1306.

Figure 14:
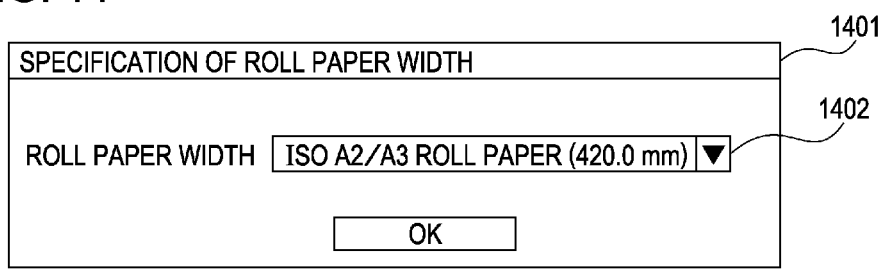
FIG. 14 shows an example of a dialog for specifying the width of roll paper.

Here, the scaling setting function of the printer driver 105, which has been explained with reference to FIGS. 13 to 14, is merely an example, and the plug-in of the present invention can be applied to a printer driver including at least one scaling setting having a similar function.

In S607 of FIG. 6, the printer driver 105, which has been explained, is set using any scaling setting function so that the scaling process from the paper size to the output size can be performed. Here, the scaling setting is performed not by opening the printer driver setting screen shown in FIGS. 13 to 14 but is internally performed for the printer driver by the plug-in program. This means is not particularly limited, and, for example, the use of extended API owned by a printer driver or the like can be conceived.

Figure 8:
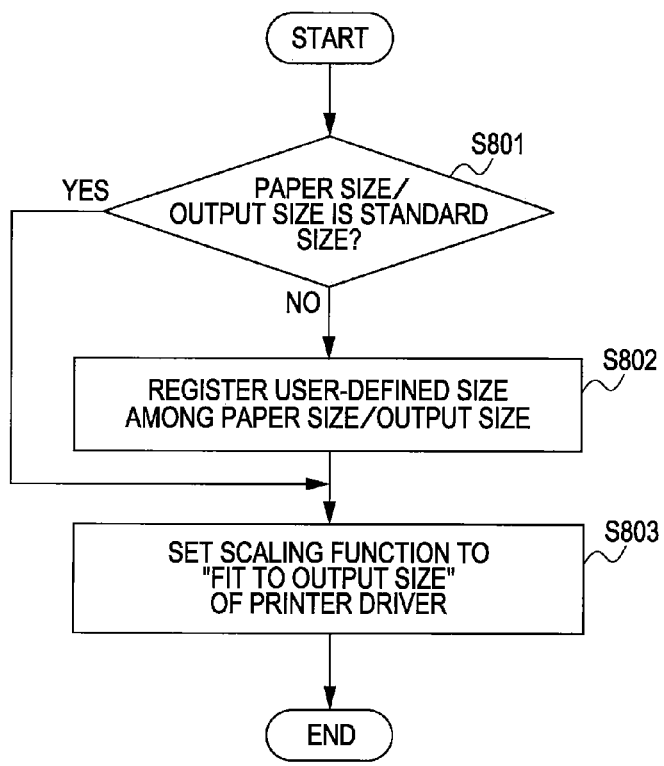
FIG. 8 shows a flow diagram of a program for performing scaling setting.

FIG. 8 is a flowchart showing the operation of the scaling setting program that is executed by the plug-in program when scaling setting for the printer driver 105 is performed in S608. The scaling setting program shown in FIG. 8 shows a flow of performing scaling setting by using, as an example, the 1303 scaling function for fitting to the output size owned by the printer driver 105.

First, in S801, it is determined whether or not the paper size and the output size are standard sizes. Here, the standard sizes refer to sizes registered in advance in the printer driver 105, and include, for example, ISO A4 (210 mm×297 mm), ISO A3 (297 mm×420 mm), and the like.

Next, in S802, for a non-standard size among the paper size and the output size, a user-defined size registration process for the printer driver 105 is performed.

Here, in general, printer drivers have a function capable of registering an arbitrary size (user-defined size) so that printing at a size other than pre-registered standard sizes can be performed. In S802, the user-defined size registration function of the printer driver 105 is utilized.

Next, in S803, scaling setting is performed for the printer driver 105 so as to fit the paper size 1301 to the output paper size 1307. Specifically, a paper size is set in the control option of the paper size 1301, and an output size is set in the control option of the output paper size 1307. Then, 1303 for fitting to the output size is selected. The description refers back to the flow of the plug-in program of FIG. 6.

In S608, the paper size (180 mm in width and 540 mm in length) calculated in the paper size calculation program in S606 is set in the application.

Next, in S609, changing of the scaling factor at which the original 305 is displayed in the document display area 304 is performed for the application. This is to set the application so that the original 305 is displayed using, for example, "fit to the page width", "display an entire page", or the like.

Finally, in S610, a process for terminating the output size specification dialog 401 is performed, and the plug-in program ends.

Further, when it is determined in S605 described above that the output size is within the maximum paper size of the application, it is determined, without performing the processing of S606, that the paper size has the same size as the output size, and the processing of S607 to S610 is performed. Then, the plug-in program ends.

In the present exemplary embodiment, a user is only required to specify the width and length of a sheet of paper to be output in a screen where an output size of a plug-in program is input in order to set a paper size, which is not greater than the maximum paper size of an application, in the application and also to set an appropriate variable scaling factor in a driver. An image can be printed at a desired output size with easy operations.

Exemplary Embodiment 2

In the present exemplary embodiment, an explanation will be given of a plug-in in which the font size of a character string to be input in an application is added to the plug-in explained in Exemplary Embodiment 1 as one piece of information to be further input by a user will be explained. The basic operation of the plug-in in Exemplary Embodiment 2 is regarded as being similar to that of Exemplary Embodiment 1, and only different operations.

Figure 15:
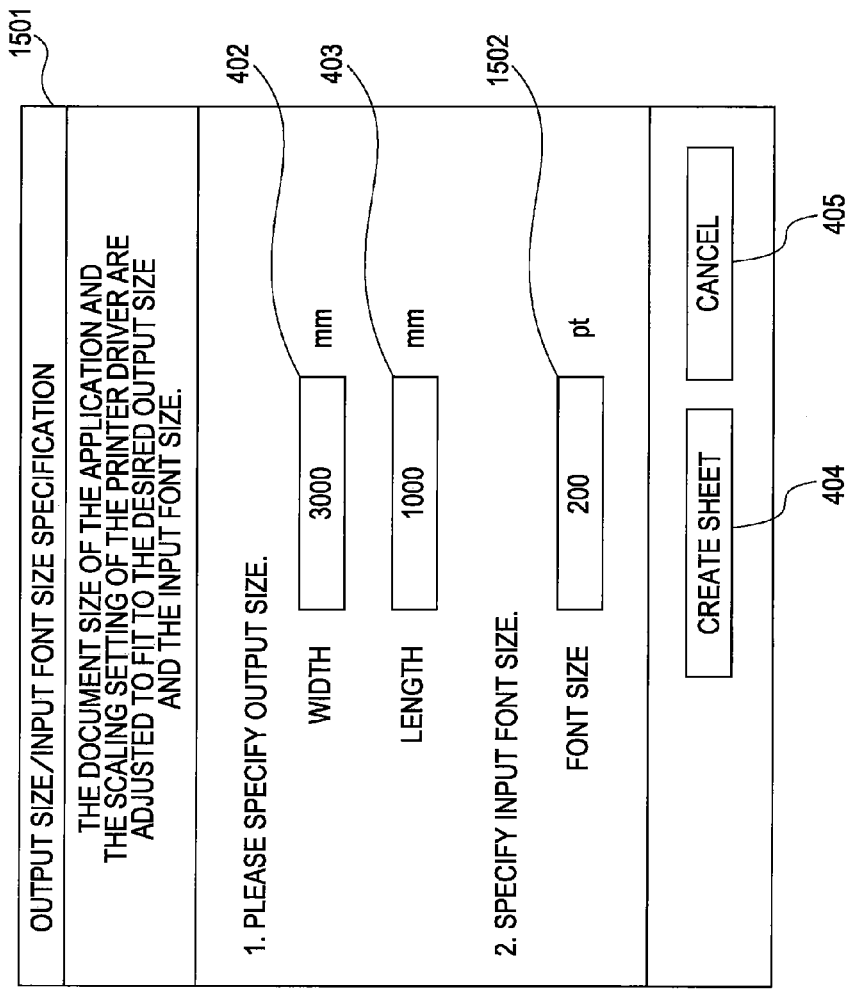
FIG. 15 shows an example of a dialog for specifying an output size and an input font size.

FIG. 15 shows an output size/input font size specification dialog 1501 in the present exemplary embodiment, which is a screen activated when the plug-in start icon 308 is pressed. Control options having the same functions as those of the output size specification dialog 401 shown in FIG. 4 are assigned the same numerals. The difference from the output size specification dialog 401 is that a font size specification control option 1502 for specifying the font size of a character string to be input is provided. Here, it is assumed that a user has specified (input) 3000 mm in the width 402 of the output size, 1000 mm in the length 403 of the output size, and 200 pt in the control option of the input font size 1502.

Figure 16:
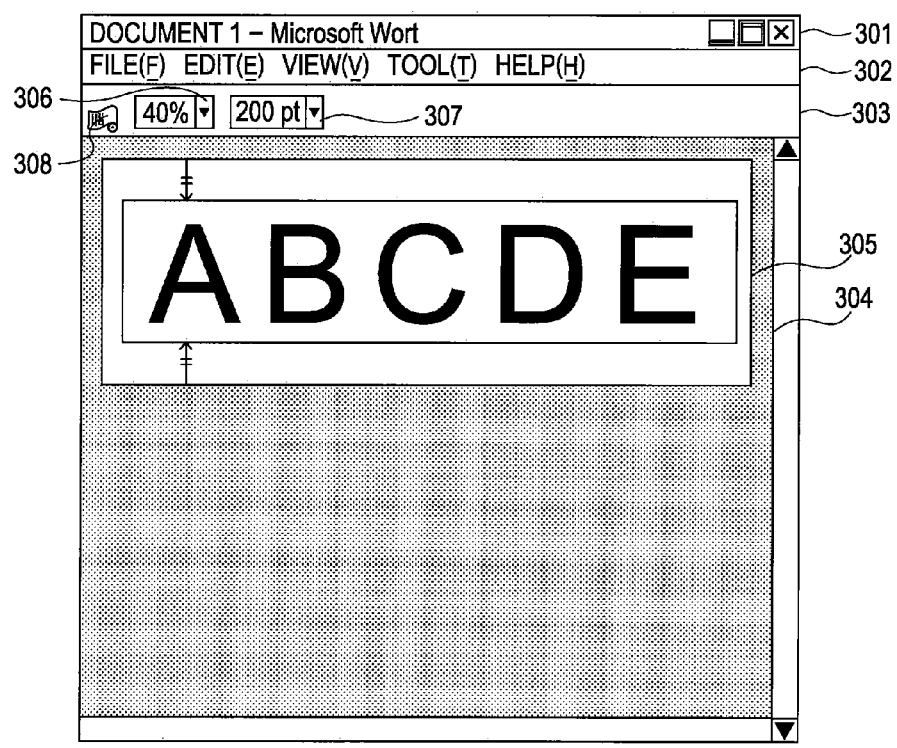
FIG. 16 shows a screen obtained after an output size in landscape format has been specified and the setting of the paper size of the application has been changed in Exemplary Embodiment 2.

FIG. 16 is a diagram showing a screen of an application after the sheet creation button 404 has been pressed in FIG. 15. The difference from FIG. 12 is that the font size specified in the input font size 1502 has been set in the font size specification control option 307. For example, when a user inputs an arbitrary character string, "abcde", as shown in the figure, the character string is placed at the center in the length direction of the original 304.

Figure 17:
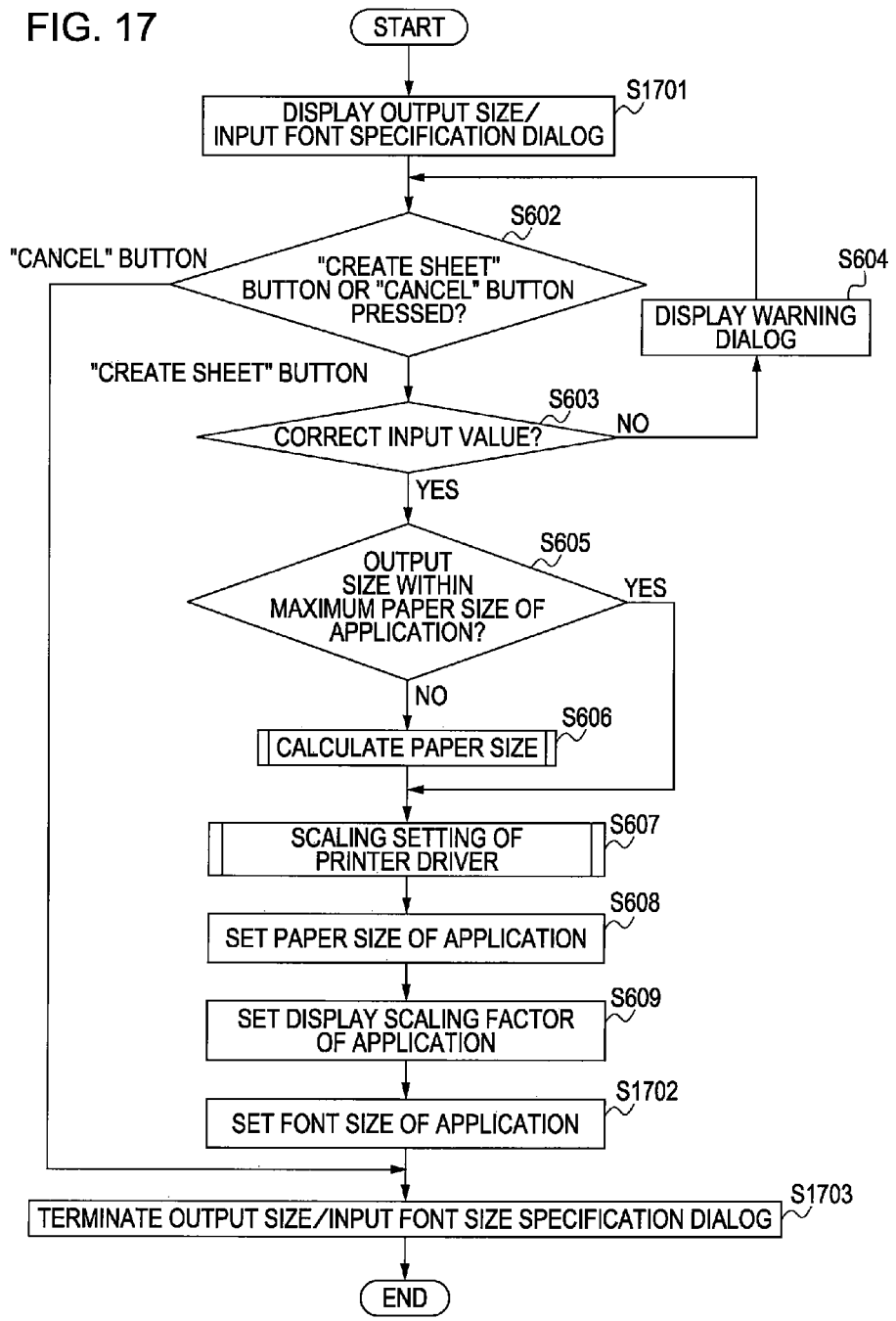
FIG. 17 shows a flow diagram of a program representing a series of operations of a plug-in in Exemplary Embodiment 2.

FIG. 17 shows a flowchart of a plug-in program representing a series of operations of the plug-in in the present exemplary embodiment. Steps for performing the same operations as those in the flowchart shown in FIG. 6 are assigned the same numerals.

First, when a user presses the plug-in start icon 308, the process proceeds to S1701. In S1701, the output size/input font size specification dialog 1501 shown in FIG. 15 is displayed. The operations from S602 to S605 are similar to those in Exemplary Embodiment 1.

Figure 18:
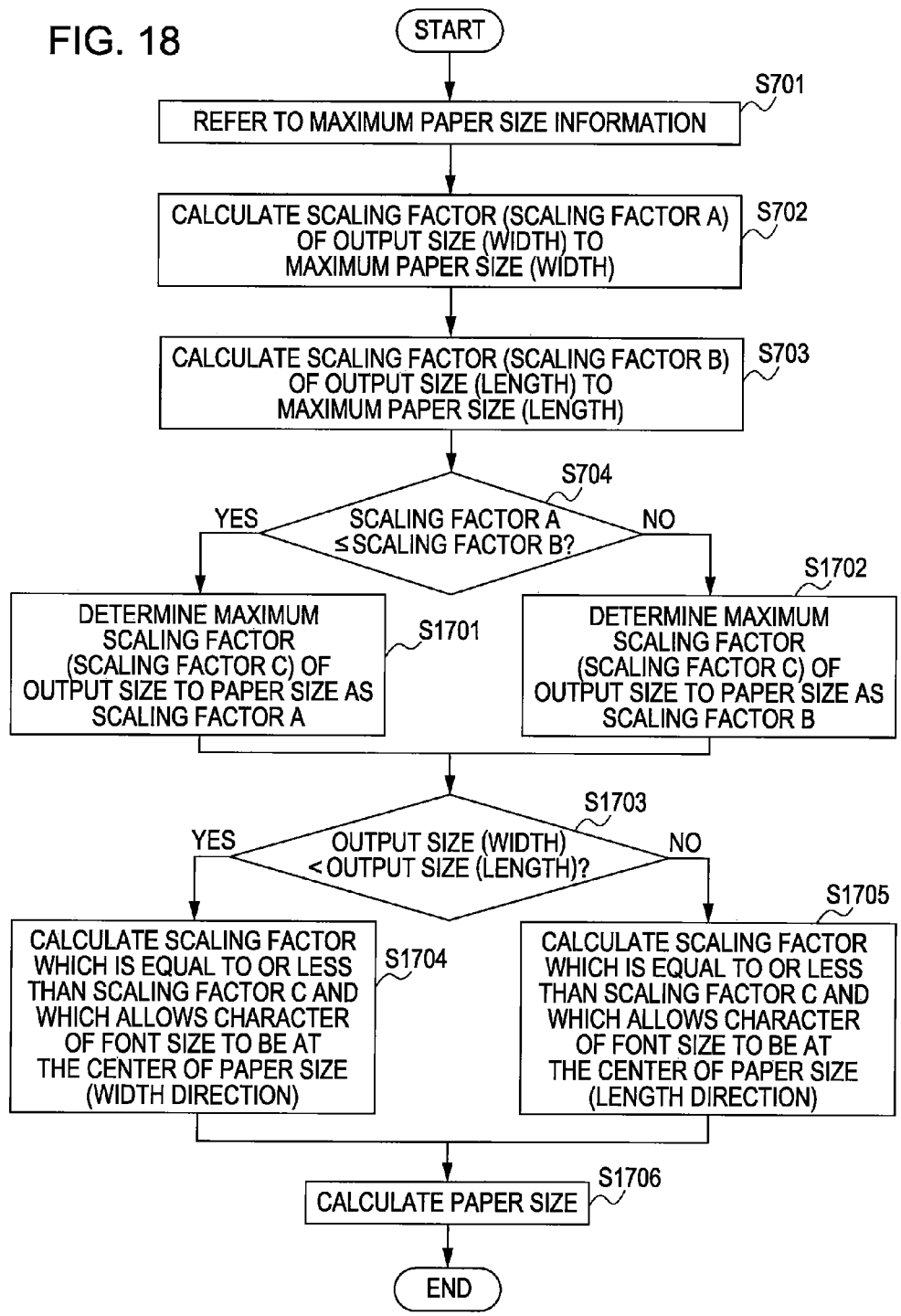
FIG. 18 shows a flow diagram of a program for calculating a paper size in Exemplary Embodiment 2.

Next, in S606, the plug-in program executes a paper size calculation program shown in FIG. 18. The processing of S701 to S704 is similar to that of FIG. 7.

When it is determined in S704 that the scaling factor A is smaller than the scaling factor B, the process proceeds to S1701. When it is determined that the scaling factor A is greater than the scaling factor B, the process proceeds to S1702.

In S1701, a process of determining that a maximum scaling factor (scaling factor C) of the output size to the paper size is the scaling factor A is performed. In S1702, a process of determining that the maximum scaling factor (scaling factor C) of the output size to the paper size is the scaling factor B is performed.

Here, since the values shown in FIG. 15 have been input, the scaling factor A is 18% (=55 cm/3000 mm) and the scaling factor B is 55% (=55 cm/1000 mm). Thus, as a result of the determination of S703, the process proceeds to S1701, in which it is determined that the scaling factor C is 18%.

Next, in S1703, a comparison is made between the width of the output size and the length of the output size. When the length of the output size is greater than the width of the output size, the process proceeds to S1704. When the length of the output size is smaller than the width of the output size, the process proceeds to S1705.

In S1704, a scaling factor of the output size to the paper size, which is a scaling factor equal to or less than the scaling factor C determined in S1701 or S1702 and which allows a character of the font size specified by the user to be at the center in the width direction of the paper size, is calculated. Further, in S1705, a scaling factor of the output size to the paper size, which is a scaling factor equal to or less than the scaling factor C determined in S1701 or S1702 and which allows a character of the font size specified by the user to be at the center in the length direction of the paper size, is calculated.

Since the values shown in FIG. 15 are 3000 mm in the width of the output size and 1000 mm in the length of the output size, as a result of the determination of S1703, the process proceeds to S1705. Then, in S1705, a scaling factor of the output size to the paper size, which allows a character with a font size of 200 pt to be positioned at the center in the length direction of the paper size, is calculated. Here, it is assumed that a scaling factor of 15% has been calculated. The following method is an example of the scaling factor calculation method of S1704 or S1705, but is not limited, and any other method may be used. While the following method will be explained in the context of S1705, a similar method can be used in S1704 to calculate a scaling factor. In the font size, one point is 1/72 inches, and thus 200 points equal 200/72 inches. Further, one inch equals 25.4 mm, and 200/72*25.4≅71 mm (rounded up after the decimal point) is obtained. Here, if the upper and lower margins are set to 38 mm in a margin setting screen (not shown), the length required as the paper size is given by adding the lengths of the upper and lower margins to the font size of the 200 points, namely, 71+38*2=147 mm. At this time, the scaling factor is determined by 147 mm/1000 mm=15% (rounded up after the decimal point), which is smaller than the scaling factor C. Thus, in S1705, 15% is determined as the scaling factor used for the calculation of a paper size. On the other hand, if the upper and lower margins are set to 60 mm, the length required as the paper size is 191 mm, and the scaling factor is determined by 191 mm/1000 mm≅20% (rounded up after the decimal point). Since this exceeds the scaling factor C, an error display is provided to the user to prompt the user to change the font size or margin setting. Since a font is placed at the center in the length direction of the calculated paper size, the upper and lower margins of a result that is actually printed on recording paper are each 38 mm or more. Herein, the length of the paper size is given by 1000*15%=150 mm, from which a font length of 71 mm is subtracted, and the result is divided into two sections for the upper and lower margins, which is given by (150 mm−71 mm)/2=39.5 mm, which is each of the upper and lower margins of this length. Since the margins set by a user are minimum lengths of the margins, no error occurs even when the margins on recording paper have lengths which are greater than or equal to the margins set by the user.

Next, in S1706, a paper size is calculated. The calculation of a paper size is performed by multiplying the output size by the scaling factor determined in S1704 or S1705.

Now, the scaling factor of the output size to the paper size is 15%. Thus, it is determined that the width of the paper size is 450 mm (=3000 mm×15%) and the length of the paper size is 150 mm (=1000 mm×15%). That is, since a paper size is calculated by multiplying the width and length of the output size by the same scaling factor, the paper size in which the aspect ratio of the output size is maintained can be calculated.

The description refers back to the flowchart of FIG. 17. After a paper size is calculated in S606, the processing of S607 to S609 is similar to that in Exemplary Embodiment 1.

In S1702, the font size 1502 is set for a word. Then, in S1703, the output size/input font size specification dialog 1501 is terminated, and the process of the plug-in program ends.

Figure 19:
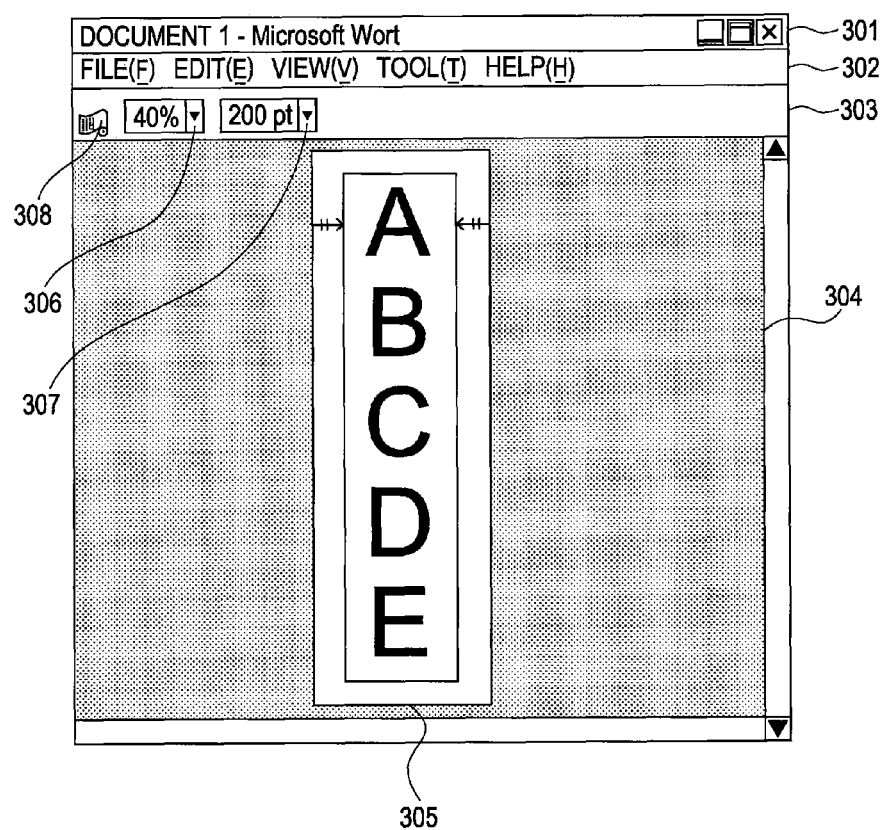
FIG. 19 shows a screen obtained after an output size in portrait format has been specified and the setting of the paper size of the application has been changed in Exemplary Embodiment 2.

In the plug-in explained in the present exemplary embodiment, the font size specified by a user is also taken into consideration when the values of the paper size are calculated. Thus, as shown in FIG. 16, when the output size is a landscape format size, a character string to be input in the application is placed at the center in the length direction of the original 305. Also, when the output size is a portrait format size, as shown in FIG. 19, and a character string to be input in the application is placed at the center in the width direction of the original 305. This allows for further improved operability when a user performs the printing of banners or long rolls of paper.

Industrial Applicability

The present invention is provided as plug-in software. However, this plug-in software is stored in a storage medium such as a CD-ROM or DVD-ROM, which is bundled with a printer at the time of shipment, and is provided to a user. Then, this storage medium is read into a computer (PC), thereby installing the plug-in software into a target application. However, without limiting to this method, the plug-in software can be stored in a predetermined server so that it can be downloaded via a telecommunication line such as the Internet, and can be downloaded from the server to a PC of a user and installed therein. Furthermore, a printer having a hard disk (HDD), which is a large-capacity storage device, can be shipped with the plug-in software stored in the HDD, and the plug-in software can be transferred from the HDD of the printer to a PC of a user so that the plug-in software can be installed into the application software on the PC. Furthermore, if an image can be recorded onto a recording medium having a size exceeding a recording paper size that can be handled in the application software, an application to an image forming apparatus other than an inkjet printer can also be made. Examples of the image forming apparatus include an electrophotographic printer, a multifunction device having a copy function and/or a FAX function, and an offset printing machine. In addition, an application to a printing machine that performs printing on recording media other than recording paper, such as plastic films or cloth, can also be made.

The invention claimed is:

1. A method comprising:
inputting a sheet size of a sheet;
executing, in a case where the input sheet size is not within a maximum page size which can be set in a page setting of an application, a setting to the page setting, the setting being for setting a page size which corresponds to an aspect ratio of the input sheet size and is within the maximum page size; and
executing a process so that data corresponding to an object arranged in the page of the page size set by the setting is scaled to a size corresponding to the input sheet size,
wherein an information processing device performs the inputting, the executing of the setting, and the executing of the process, by executing a plug-in program for extending functionality of the application.

2. The method according to claim 1, further comprising,
specifying a font size of a character to be arranged in the page;
wherein the page size is set to the application according to the specified font size, by the setting,
and wherein the information processing device performs the specifying, by executing the plug-in program.

3. The method according to claim 2, wherein the page of the page size set by the setting is a page which allows the character to be positioned at a center in a width direction of the page in a case where the input sheet size is a portrait format size, and which allows a character string to be positioned at a center in a length direction of the page in a case where the input sheet size is a landscape format size.

4. The method according to claim 1, wherein a setting for a scaling factor for displaying the page by the application is set to the application, in a case where the page size is set by the setting.

5. The method according to claim 4, wherein the setting for the scaling factor for displaying the page is set to the application, so that a whole of the page is displayed in an area where the application can display a page.

6. The method according to claim 1, wherein in a case where the input sheet size is within the maximum page size, the input sheet size is set to the application by the setting.

7. The method according to claim 1, wherein, in a case where the input sheet size is not within the maximum page size, a page size which corresponds to the maximum page size and the aspect ratio of the input sheet size is set to the application by the setting.

8. The method according to claim 7, wherein in the page size set to the application, at least one of a width and a length corresponds to the maximum page size.

9. The method according to claim 8, wherein in the page size set to the application, at least one of the width and the length has a width or a length of the maximum page size.

10. The method according to claim 1, wherein in a case where an aspect ratio of the page of which the page size has been set in the page setting of the application and the aspect ratio of the input sheet size are different, the aspect ratio of the page is changed to the aspect ratio of the input sheet size by the setting.

11. The method according to claim 1, wherein the page of the page size set by the setting is displayed on a display apparatus by the application, so that the object can be arranged in the page by the application,
and wherein the page is displayed based on execution of the plug-in program by the information processing device.

12. The method according to claim 1, wherein the process is executed to a printer driver used for printing of the data, so that the printer driver scales the data to the size corresponding to the input sheet size.

13. The method according to claim 12, wherein the input sheet size is set in the printer driver by the process.

14. The method according to claim 13, wherein a size corresponding to the page size set by the setting is further set to the printer driver by the process.

15. The method according to claim 12, wherein a scaling factor is set to the printer driver by the process, so that the data is scaled to the size corresponding to the input sheet size.

16. The method according to claim 12, wherein the process is executed to the printer driver, so that only one of a width and a length of the input sheet size is set to the printer driver and the data is scaled by the printer driver in accordance with only one of the width and the length of the input sheet size.

17. The method according to claim 1, further comprising causing a display apparatus to display a screen for a user to designate the sheet size, in accordance with an instruction of the user,
wherein the sheet size designated in the displayed screen is input,
and wherein the screen is displayed by execution of the plug-in program by the information processing device.

18. The method according to claim 17, wherein the screen for the user to designate a width and a length of the input sheet size is displayed.

19. The method according to claim 17, wherein a sheet size which is not supported by a printer used for printing of the data, is not input in the inputting.

20. A device comprising:
an input unit for inputting a sheet size;
a setting unit for executing, in a case where the input sheet size is not within a maximum page size which can be set in a page setting of an application, a setting to the page setting, the setting being for setting a page size which corresponds to an aspect ratio of the input sheet size and is within the maximum page size; and
a processing unit for executing a process so that data corresponding to an object arranged in the page of the page size set by the setting is scaled to a size corresponding to the input sheet size,
wherein the device functions as the input unit, the setting unit, and the process unit, by executing a plug-in program for extending functionality of the application.

21. The device according to claim 20, wherein a scaling factor for displaying the page by the application is set to the application in a case where the page size is set by the setting.

22. The device according to claim 21, wherein the setting for the scaling factor for displaying the page is set to the application, so that a whole of the page is displayed in an area where the application can display a page.

23. The device according to claim 20, wherein the processing unit executes the process to a printer driver used for printing of the data, so that the printer driver scales the data to the size corresponding to the input sheet size.

24. A non-transitory computer-readable storage medium storing a plug-in program for extending functionality of an application and for performing a method, the method comprising:
inputting a sheet size of a sheet;
executing, in a case where the input sheet size is not within a maximum page size which can be set in a page setting of the application, a setting to the page setting, the setting being for setting a page size which corresponds to an aspect ratio of the input sheet size and is within the maximum page size; and
executing a process so that data corresponding to an object arranged in the page of the page size set by the setting is scaled to a size corresponding to the input sheet size,
wherein an information processing device performs the inputting, the executing of the setting, and the executing of the process, by executing the plug-in program.

25. The storage medium according to claim 24, wherein the page of the page size set by the setting is a page which allows a character to be positioned at a center in a width direction of the page in a case where the input sheet size is a portrait format size, and which allows a character string to be positioned at a center in a length direction of the page in a case where the input sheet size is a landscape format size.

26. The storage medium according to claim 24, further comprising,
specifying a font size of a character to be arranged in the page;
wherein the page size is set to the page setting of the application according to the specified font size, by the setting.

27. The storage medium according to claim 24, wherein a setting for a scaling factor for displaying the page by the application is set to the application, in a case where the page size is set by the setting.

28. The storage medium according to claim 27, wherein the setting for the scaling factor for displaying the page is set to the application, so that a whole of the page is displayed in an area where the application can display a page.

29. The storage medium according to claim 24, wherein in a case where an aspect ratio of the page of which the page size has been set in the page setting of the application and the aspect ratio of the input sheet size are different, the aspect ratio of the page is changed to the aspect ratio of the input sheet size by the setting.

30. The storage medium according to claim 24, wherein the page of the page size set by the setting is displayed on a display apparatus by the application, so that the object can be arranged in the page by the application.

31. The storage medium according to claim 24, wherein a page size of which at least one of a width and a length corresponds to a width or a length of the maximum page size is set to the application.

32. The storage medium according to claim 24, wherein the process is executed to a printer driver used for printing of the data, so that the printer driver scales the data to the size corresponding to the input sheet size.

33. The storage medium according to claim 32, wherein the input sheet size is set in the printer driver by the process.

34. The storage medium according to claim 33, wherein the page size set by the setting is further set to the printer driver by the process.

35. The storage medium according to claim 32, wherein a scaling factor is set to the printer driver by the process, so that the data is scaled to the size corresponding to the input sheet size.

36. The storage medium according to claim 32, wherein the process is executed to the printer driver, so that only one of a width and a length of the input sheet size is set to the printer driver and the data is scaled by the printer driver in accordance with only one of the width and the length of the input sheet size.

37. The storage medium according to claim 24, wherein in a case where the input sheet size is within the maximum page size, a page of which a page size corresponds to the input sheet size is set to the application.

38. The storage medium according to claim 24, the method further comprising causing a display apparatus to display a screen for a user to designate the sheet size, in accordance with an instruction of a user,
   wherein the sheet size designated in the displayed screen is input.

39. The storage medium according to claim 38, wherein the screen is displayed for the user to designate a width and a length of the input sheet size.

40. The storage medium according to claim 38, wherein a sheet size which is not supported by a printer used for printing of the data, is not input in the inputting.

\* \* \* \* \*